United States Patent [19]

Okada et al.

[11] Patent Number: 5,722,753
[45] Date of Patent: Mar. 3, 1998

[54] LAMP DEVICE OF LIQUID-CRYSTAL PROJECTION APPARATUS

[75] Inventors: Takehiro Okada, Ibaraki; Yaoki Maeda, Minoo; Shigeru Aruga, Moriguchi; Tadashi Ohira, Kobe; Tsuguhide Ioki; Shigekazu Yamagishi, both of Takatsuki, all of Japan

[73] Assignee: Matsushita Electric Industrial Co., Ltd., Osaka, Japan

[21] Appl. No.: 736,485

[22] Filed: Oct. 24, 1996

[30] Foreign Application Priority Data

Nov. 1, 1995 [JP] Japan ................................. 7-309792
Jun. 17, 1996 [JP] Japan ................................. 8-155127

[51] Int. Cl.$^6$ ................................................. G03B 21/14
[52] U.S. Cl. ................................. 353/119; 353/57
[58] Field of Search ........................... 353/52, 57, 58, 353/60, 61, 87, 85, 119; 362/296, 306, 310, 345, 294

[56] References Cited

U.S. PATENT DOCUMENTS 3,642,361  2/1972  Steu ......................................... 362/345
4,787,737  11/1988  Ogawa et al. ............................. 353/60
4,925,295  5/1990  Ogawa et al. ............................. 353/85
5,418,586  5/1995  Fujimori et al. ......................... 353/58

FOREIGN PATENT DOCUMENTS

2-196280  8/1990  Japan.
4-323643  11/1992  Japan.
5-251054  9/1993  Japan.

Primary Examiner—William Dowling
Attorney, Agent, or Firm—Watson Cole Stevens Davis, P.L.L.C.

[57] ABSTRACT

There is disclosed a liquid-crystal projection apparatus having a lamp device which has such a sealed or closed construction that a sound, produced upon bursting of a light-emitting tube, is suppressed and that the scattering of glass pieces is prevented. In this liquid-crystal projection apparatus, a lamp is sealed by a support member, supporting a concave mirror having two notches and an outer casing and a flat glass panel and an air passage is formed in the support member. The lamp is releasably attached to a lamp fixing member and two open portions are formed in this lamp fixing member and a cooling fan is fixedly connected to one of the two open portions.

9 Claims, 8 Drawing Sheets

LAMP DEVICE OF LIQUID-CRYSTAL PROJECTION APPARATUS

BACKGROUND OF THE INVENTION

1. Field of the Invention

This invention relates to a light source device of a liquid-crystal projection apparatus which projects an image of liquid-crystal panels in a magnified manner by light from a light source.

2. Related Art

Figure 7:
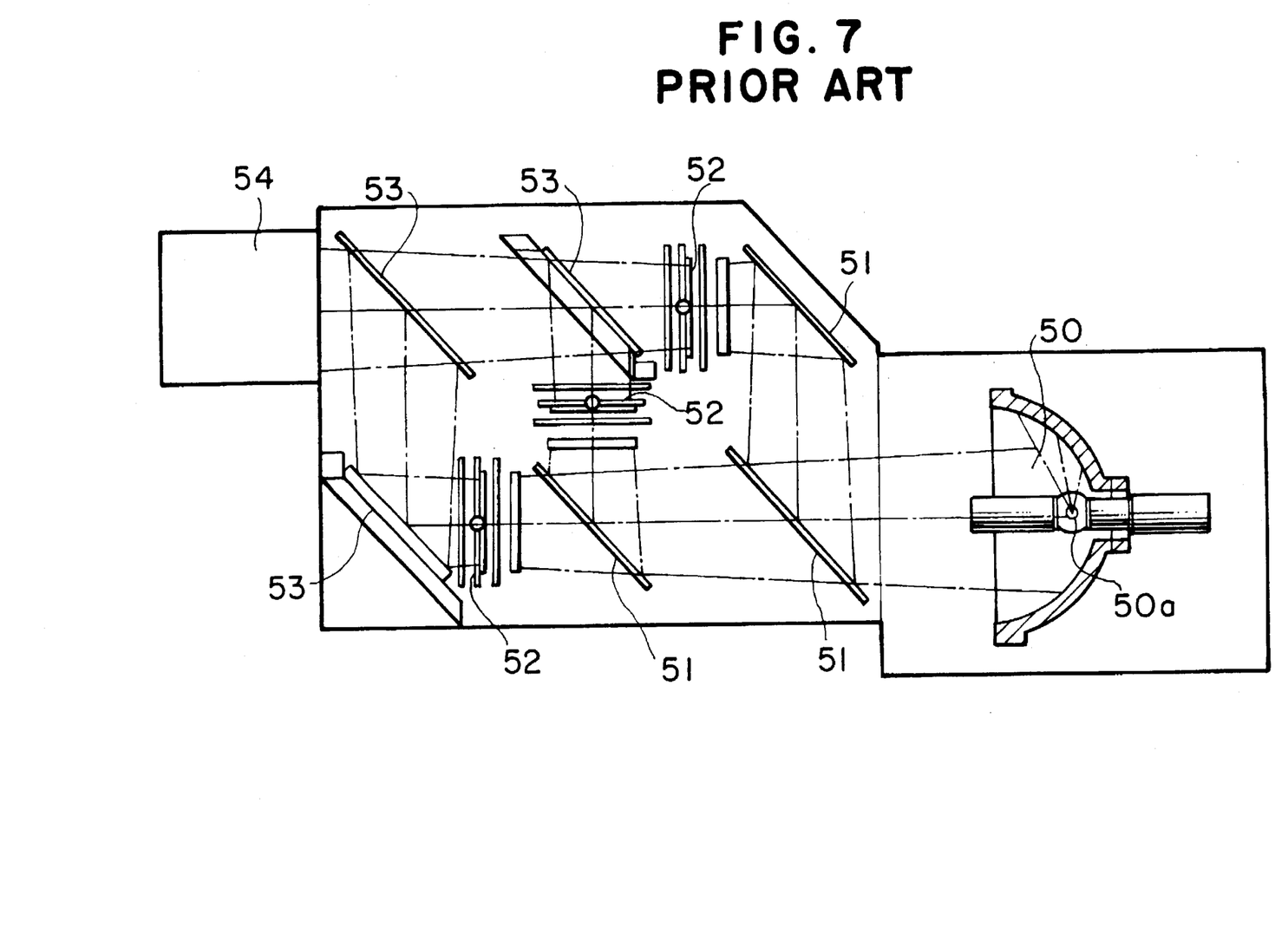
FIG. 7 is a front-elevational view schematically showing a conventional liquid-crystal projection apparatus.
Figure 8A:
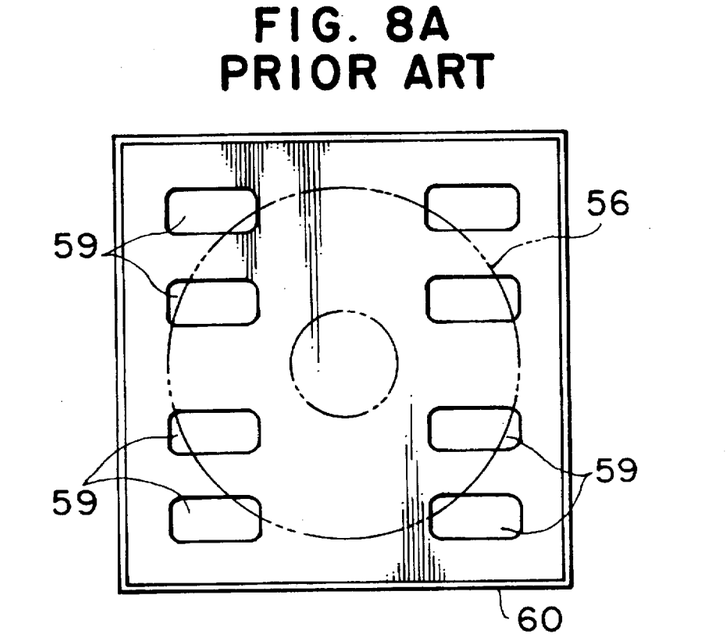
FIG. 8A is a plan view of a lamp device thereof.
Figure 8B:
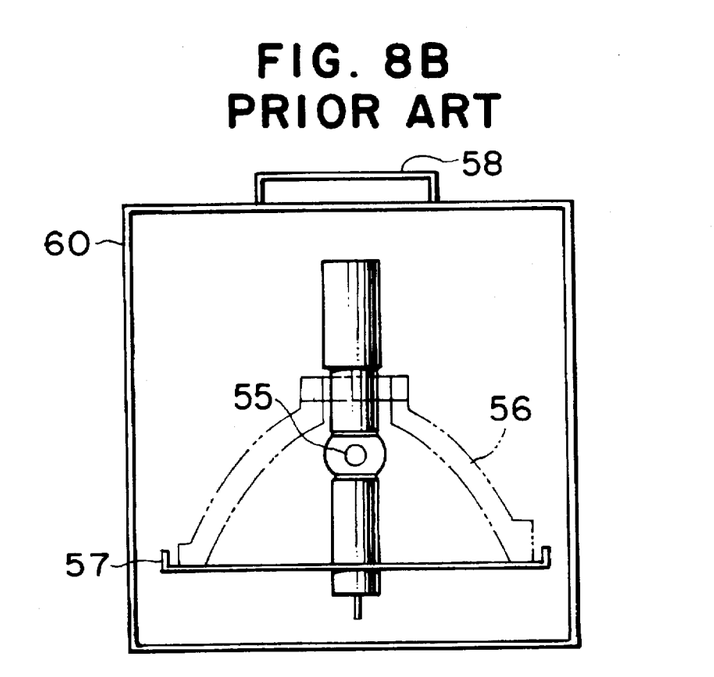
FIG. 8B is a front-elevational view thereof.

There have heretofore been marketed apparatuses or systems in which an image of liquid-crystal panels is projected in a magnified manner, utilizing light from a light source such as a metal halide. In such apparatus, light, emitted from the light source, converges on a group of liquid crystals (e.g. liquid-crystal panels) through mirrors and so on, and is displayed on a screen through a projection lens. There are two types of such apparatuses, and more specifically one is a front projection type in which a screen is separate from a liquid-crystal projection apparatus body, and the other is a rear projection type in which a screen, a group of liquid crystals, a light source, mirrors and so on are combined together, and image light transmits through the screen. FIG. 7 shows an overall layout of such a front projection type, and in this front projection type, generally, light from a lamp 50 is subjected to color separation by color separation mirrors 51, and three colors (R, G, B) transmit through respective liquid-crystal panels 52, and the light is subjected to color composition by color composition mirrors 53, and the light is projected from a projection lens 54 in a magnified manner. The lamp 50 is driven under high pressure so as to enhance the brightness of a light source 50a, and the temperature of the vicinity of the light source 50a becomes as high as 200° to 300° C. Generally, a metal halide lamp is used as the lamp 50, and since the brightness is reduced about 50% when the lamp is used for about 1,000 hours, the lamp is, in many cases, in the form of a box so that it can be replaced by a new one. In order to cool the above high-temperature portion, a cooling fan is used for feeding a current of cooling air to a concave mirror (mounted on the lamp) and its neighboring portion in a predetermined direction so as to discharge hot air to the exterior of the set. FIGS. 8A and 8B show a conventional lamp device of the common type. A light-emitting portion 55 is cemented to a concave mirror 56, and is fixedly secured to a base plate 57. Generally, these component parts are enveloped by an outer casing 60 which has a handgrip 58 formed on its outer surface, and has many cooling holes (ventilation holes) 59. A light-emitting tube of the lamp often bursts at a final stage of its lifetime, and despite this, in many cases, there have not been provided any means for preventing the scattering of glass pieces and any means for suppressing the sound.

Thus, when the light-emitting tube of the lamp device of the conventional liquid-crystal projection apparatus bursts at a final stage of its lifetime, the glass pieces scatter, and also a large sound is produced, and therefore it has been desired to provide means for dealing with these problems. A current of cooling air must be supplied from the fan into the lamp holder casing in order to cool the lamp; however, if the lamp device is formed into a sealed or closed construction in order to prevent the scattering of the glass pieces and to suppress the sound, it has been difficult to efficiently cool the lamp, and this has shortened the lifetime of the lamp.

SUMMARY OF THE INVENTION

With the above problems in view, it is an object of this invention to provide a lamp device of a liquid-crystal projection apparatus which has such a sealed or closed construction that even if a light-emitting tube of the lamp should burst, glass pieces will not scatter, and also has a good cooling efficiency.

According to the present invention, there is provided a liquid-crystal projection apparatus comprising a lamp having a light source portion; a group of liquid crystals for controlling the transmission of light from the light source portion; a group of mirrors for effecting color separation and color composition of the light from the light source portion; a lighting stabilizer containing a circuit for lighting the lamp; lamp fixing means; a cooling fan for feeding the air so as to cool the lamp; and a projection lens for enlarging and reducing a transmitting-light image formed by the group of liquid crystals;

wherein the lamp comprises a concave mirror for reflecting the light from the light source portion to the group of mirrors in such a manner that the reflected light is formed into generally parallel rays of light, the concave mirror having a pair of first and second notches formed respectively at its upper and lower portions; a support member supporting the concave mirror; an outer casing which encloses the concave mirror and the light source portion, and is fixedly mounted on the support member, the outer casing having through holes formed through one side wall thereof; a flat glass panel fixedly mounted on the support member for transmitting the generally parallel rays of light therethrough; and an air passage formed within the outer casing.

In the lamp construction of the liquid-crystal protection apparatus according to the present invention, the air passage, extending from a first open portion (the cooling air inlet side) of the lamp fixing means to a second open portion (the cooling air outlet side) of the lamp fixing means, is formed, and the lamp device is closed except for this air passage. Therefore, the air, introduced into the lamp, is efficiently discharged therefrom as hot air. Even if the light-emitting portion (light source portion) should burst to produce a large sound, the sound hardly leaks to the exterior because of the double-box construction (constituted by the lamp fixing means and the outer casing). And besides, even if glass pieces and so on are scattered upon bursting of the light-emitting tube, these will not enter the set from the lamp box since the lamp device is closed except for the air passage.

In the present invention, the lamp comprises a concave mirror for reflecting the light from the light source portion to the group of mirrors in such a manner that the reflected light is formed into generally parallel rays of light, the concave mirror having a pair of first and second notches formed respectively at its upper and lower portions; a support member supporting the concave mirror; an outer casing which encloses the concave mirror and the light source portion, and is fixedly mounted on the support member, the outer casing having through holes formed through one side wall thereof; a flat glass panel fixedly mounted on the support member for transmitting the generally parallel rays of light therethrough; and an air passage formed within the outer casing. With this construction, the air, introduced into the lamp, is efficiently discharged to the exterior, and even if the light-emitting portion (light source portion) should burst, the sound is insulated, and also the scattering of the glass pieces is prevented.

Preferably, the support member includes a mounting portion supporting the concave mirror, and a base portion mounted substantially perpendicularly on the mounting portion, and the base portion has two notch holes communicating with the second notch, and an air passage, extending between the two notch holes, is formed in the base portion. With this construction, the lamp device can be efficiently cooled while keeping the lamp device in a closed condition.

Preferably, the lamp fixing means is releasably fitted relative to the lamp, and has a first open portion to which the cooling fan is directly connected, and a second open portion, and an air passage, extending from the cooling fan to the second open portion sequentially via the outside of the concave mirror, the first notch in the concave mirror, the second notch in the concave mirror and the two notch holes, is formed, and one of the two notch holes overlaps the second open portion. With this construction, the air passage can be efficiently formed in the lamp device.

Preferably, the lighting stabilizer has an opening, and an intake side of the cooling fan is connected directly to the opening, and a discharge side of the cooling fan is connected directly to the first open portion of the lamp fixing means. With this construction, the lighting stabilizer can be cooled.

Preferably, an intake Side of the cooling fan is connected directly to a second open portion of the lamp fixing means, and an air passage, extending sequentially via the two notch holes, the second notch in the concave mirror, the first notch in the concave mirror and the outside of the concave mirror, is formed. With this construction, also, the air passage can be efficiently formed in the lamp device.

Preferably, the flat glass panel is sandwiched between two elastic members, and is fixedly mounted on the support member. With this construction, the flat glass panel is held in such a manner that a load will not act on this flat glass panel.

Preferably, a sound insulating material for absorbing a sound is mounted on an inner surface of the outer casing. With this construction, the sound insulation can be effectively achieved.

Preferably, the support member has two fitting holes in a plan generally parallel to the base portion, and the lamp fixing means includes two positioning shafts, and the two positioning shafts are fitted respectively into the fitting holes so as to guide the attachment and detachment of the lamp. With this arrangement, the lamp can be easily attached to and detached from the predetermined position.

Preferably, the air passage, formed in the base portion, has narrow portions and wide portions arranged alternately. With this construction, the cooling efficiency can be enhanced.

DESCRIPTION OF THE PREFERRED EMBODIMENTS

One preferred embodiment of the present invention will now be described with reference to FIGS. 1 to 6. Since a liquid-crystal projection apparatus body used here is similar to the conventional one, its lamp box and lamp holder means will be described here.

Figure 1:
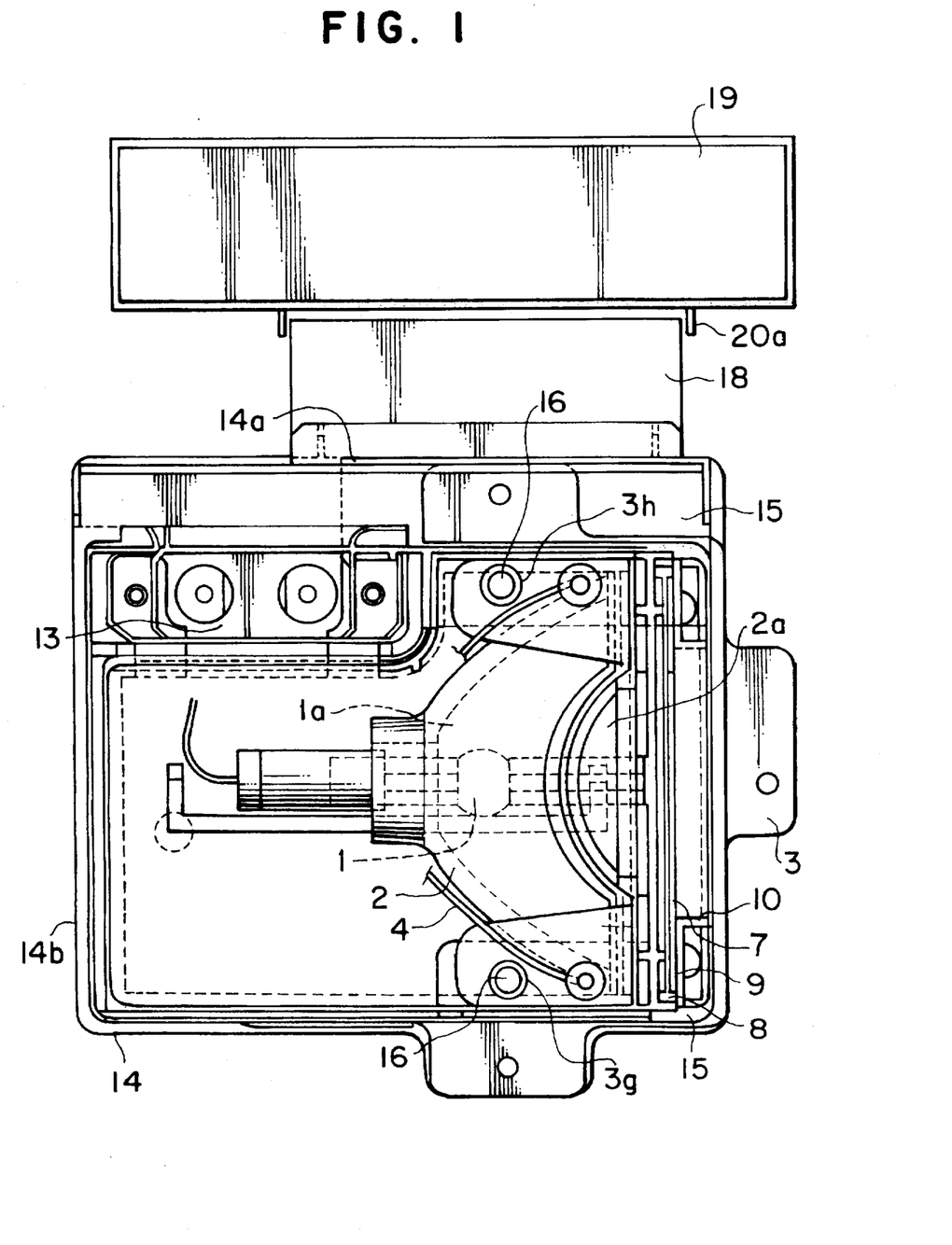
FIG. 1 is a plan view showing an overall construction of a lamp device of a liquid-crystal projection apparatus according to one preferred embodiment of the present invention, showing the interior of this lamp device.
Figure 2:
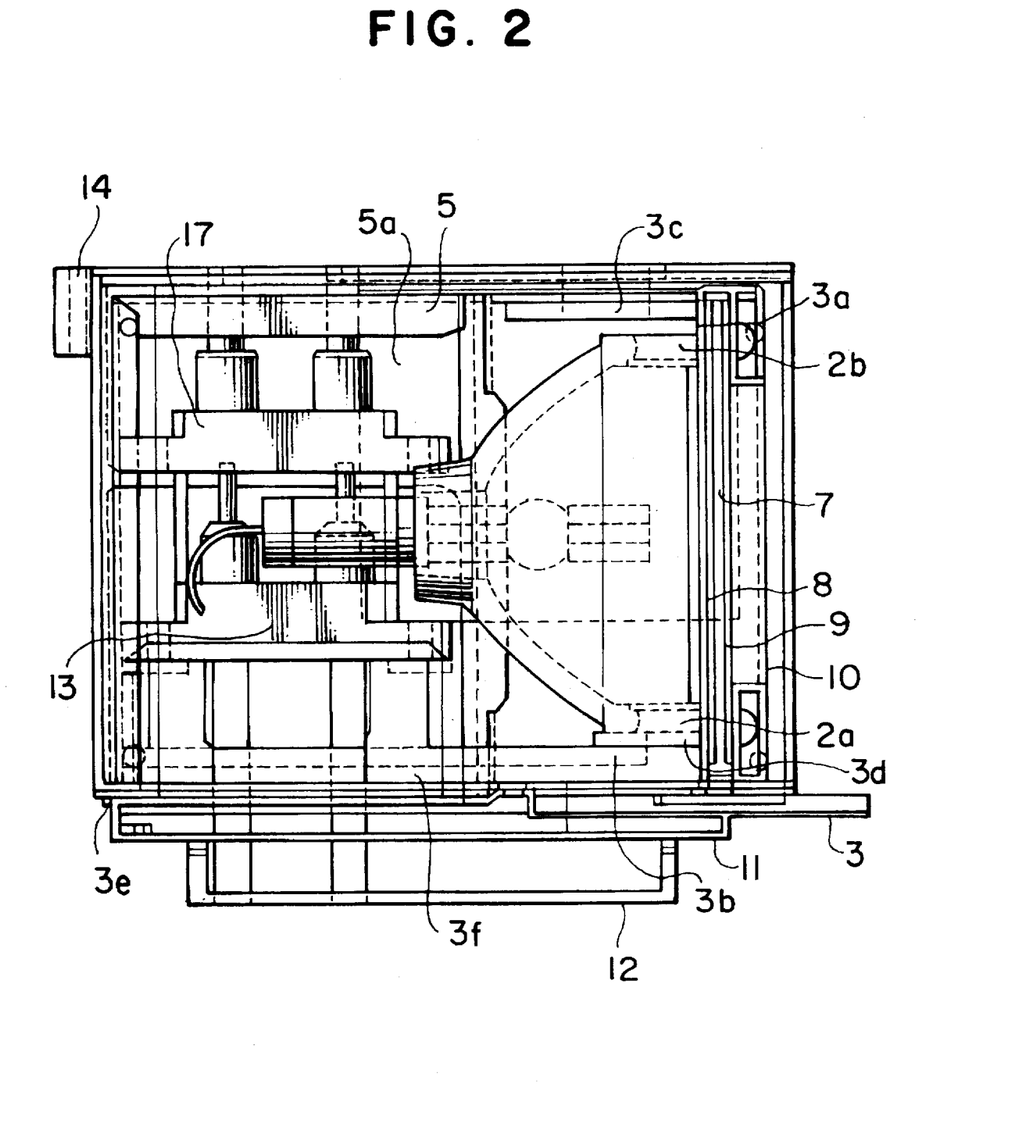
FIG. 2 is a front-elevational view thereof.
Figure 3:
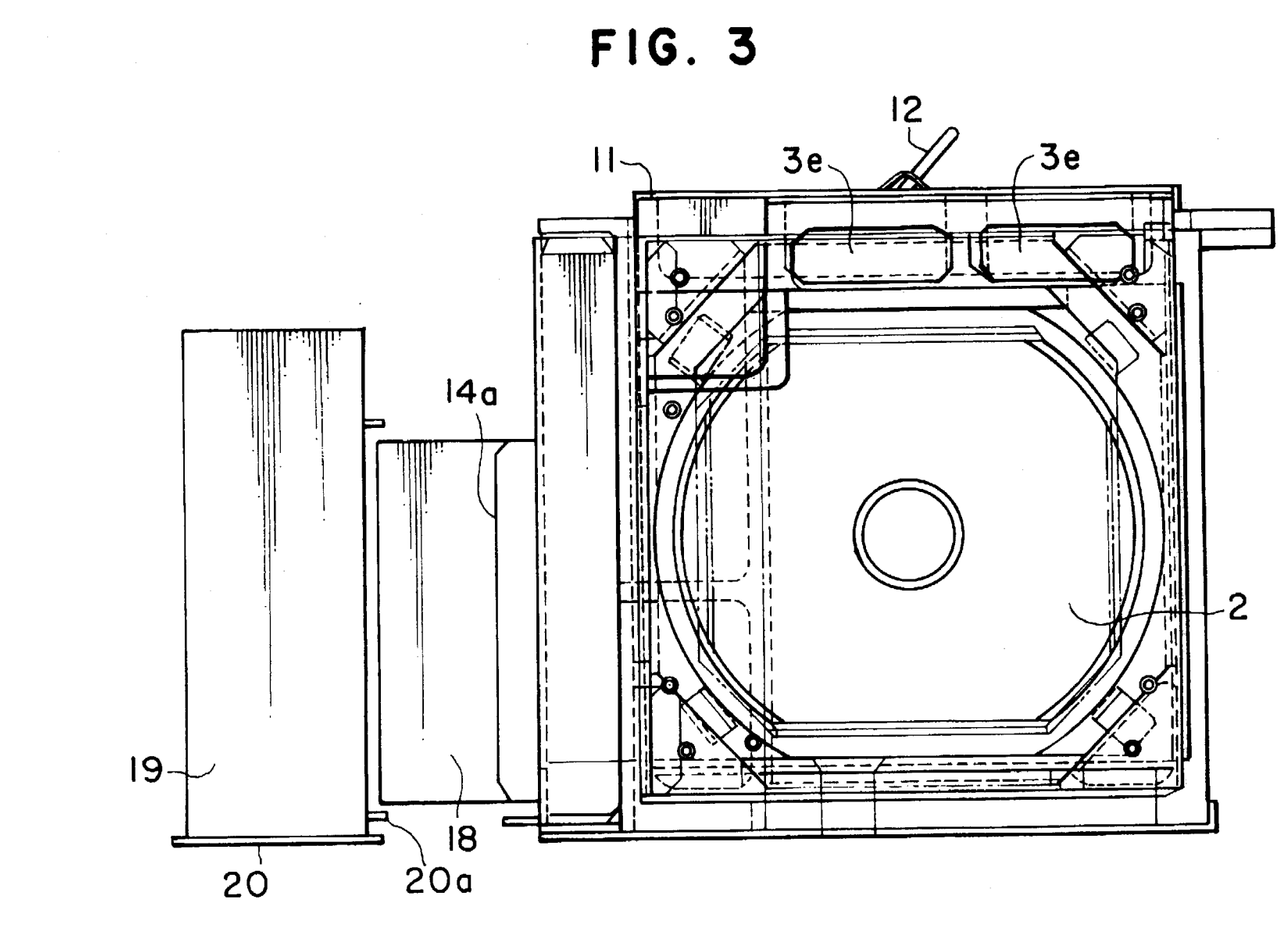
FIG. 3 is a side-elevational view thereof.
Figure 4A:
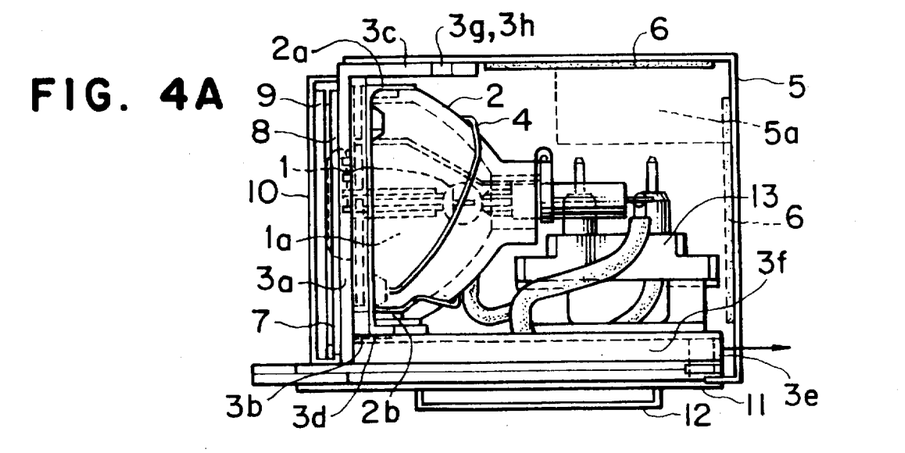
FIG. 4A is a front-elevational view of a lamp unit.
Figure 4B:
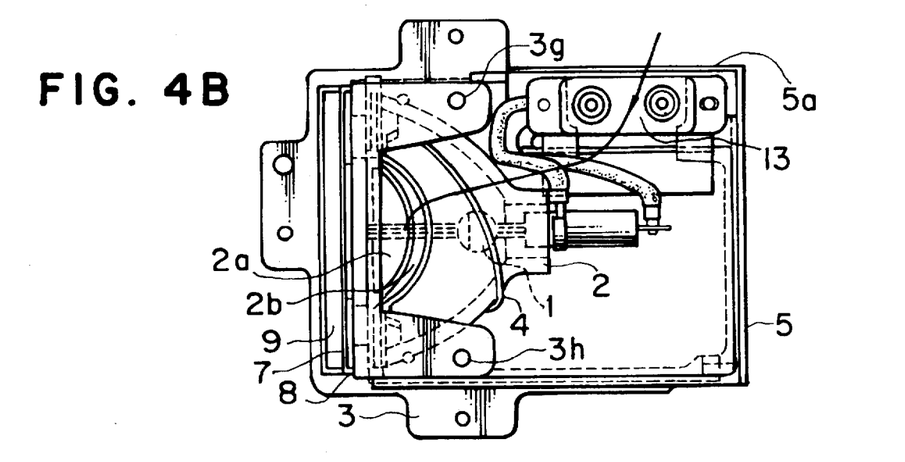
FIG. 4B is a plan view thereof.
Figure 4C:
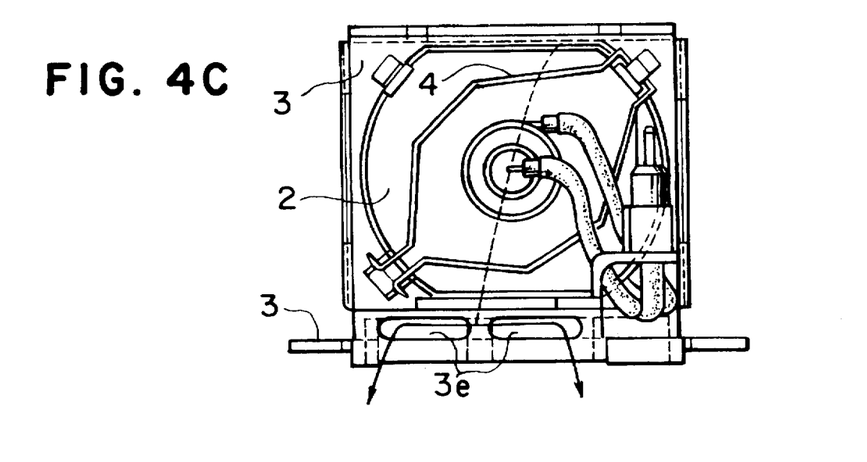
FIG. 4C is a right side-elevational view thereof, showing the interior thereof.

FIG. 1 is a plan view showing an overall construction of a lamp of this embodiment, showing the interior thereof. FIG. 2 is a front-elevational view thereof, and FIG. 3 is a side-elevational view thereof. FIG. 4A is a front-elevational view showing a lamp unit, FIG. 4B is a plan view thereof, and FIG. 4C is a right side-elevational view thereof, showing the interior thereof.

Figure 5:
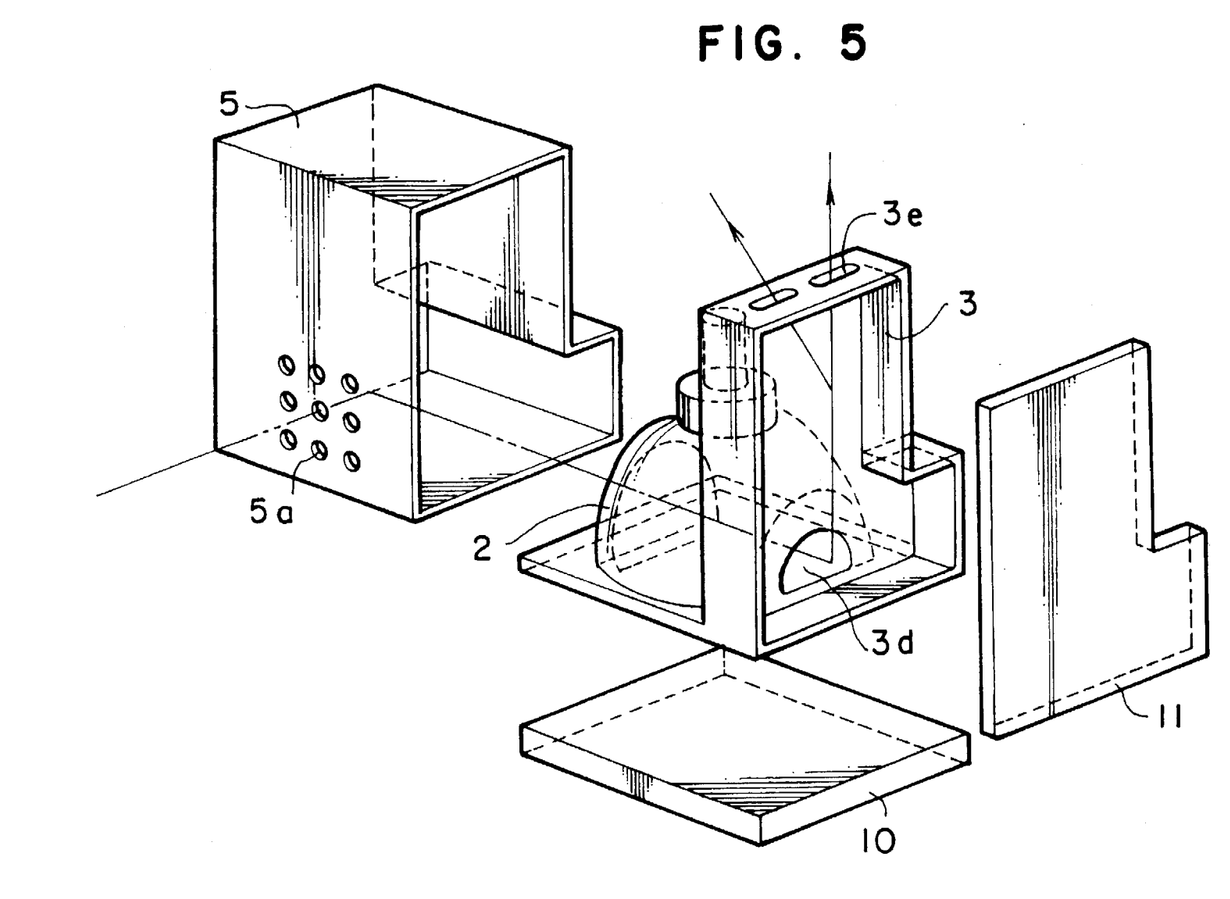
FIG. 5 is an exploded, perspective view of the lamp box unit of the invention.
Figure 6:
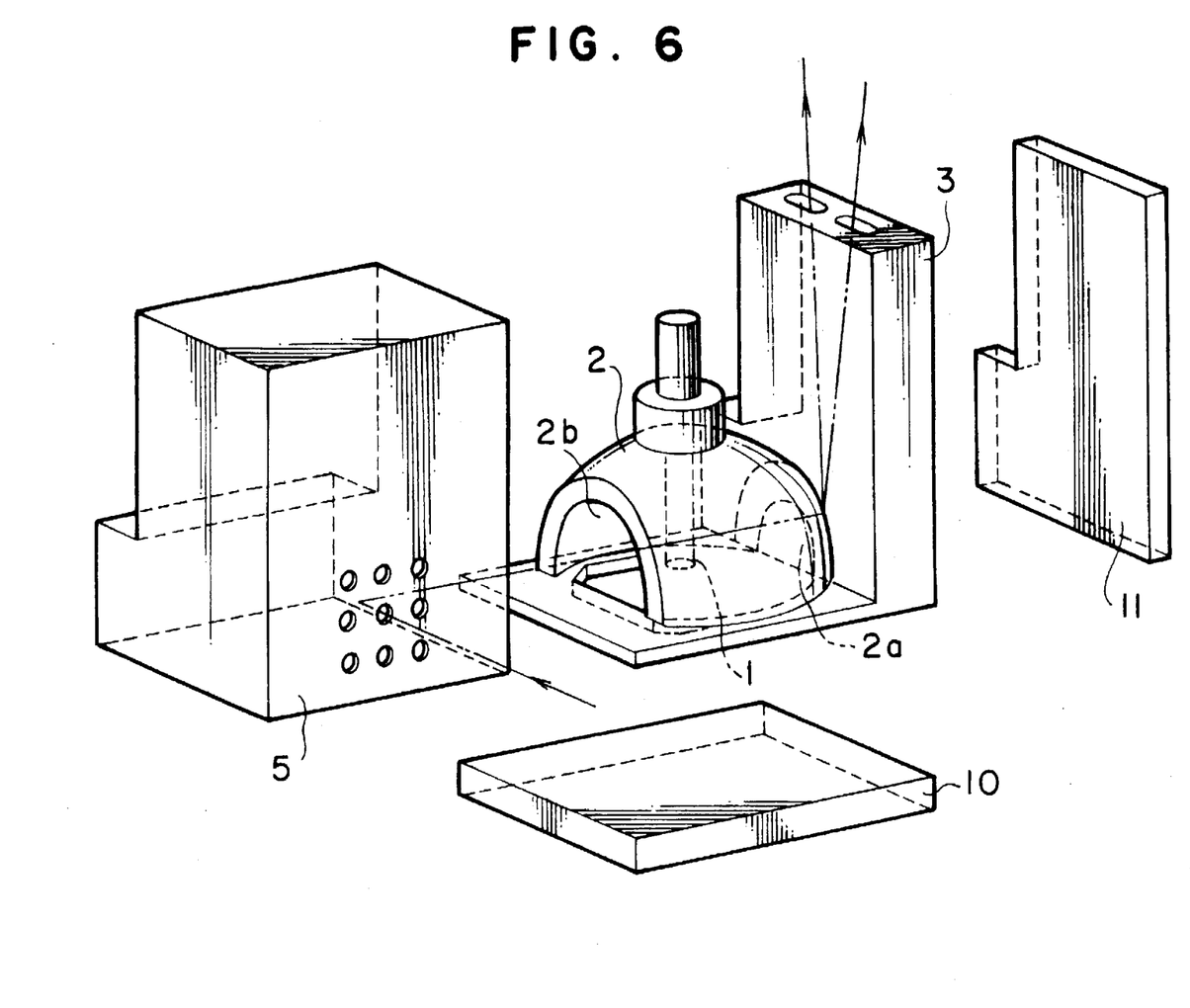
FIG. 6 is an exploded, perspective view of the lamp box unit of the invention.

FIGS. 5 and 6 are exploded, perspective views of the lamp unit, showing the flow of the air indicated by arrows.

A light-emitting tube 1, constituting a light source portion, is cemented to a concave mirror 2 in a lamp 1a, and is so aligned with the concave mirror 2 as to achieve an illumination balance. The concave mirror 2 is of a semi-ellipsoidal shape, and has a first notch 2a and a second notch 2b. A support member 3 comprises a mounting portion 3a, a base portion 3b, and a reference portion 3c having two fitting holes 3g and 3h. The support member 3 is fixed by a spring 4 engaged with a retainer portion formed on the mounting portion 3a. The base portion 3b has a first notch hole 3d and second notch holes 3e, and a duct-like air passage 3f is formed in the base portion 3b. Thus, the support member 3 is formed into an integral construction of a channel-shaped (or U-shaped) cross-section. The second notch 2b is contiguous to the notch hole 3d (that is, the second notch 2b communicates directly with the notch hole 3d). With this arrangement, a single air passage, extending from the first notch 2a to the notch holes 3e, is formed. An outer casing 5 is fixedly secured to the support member 3, and encloses the light-emitting tube 1 and the concave mirror 2. Through holes 5a are formed through one side wall of the outer casing 5, and sound insulating members 6, made of a foamed material, are affixed respectively to inner surfaces of the outer casing 5. A flat glass panel 7 is sandwiched between elastic members 8 and 9, and is retained by a metal member 10, fixed to the support member 3, in such a manner that a load will not act on the flat glass panel 7. A handgrip base member 11 is fixedly secured to the base portion 3b, and a handgrip 12 is mounted on the handgrip base member 11. A socket 13, connected to the light-emitting tube 1 by lead wires, is fixedly mounted on the base portion 3b. Thus, the lamp box can be replaceable as a unit comprising the component parts 1 to 13.

A lamp box-fixing means will now be described. A lamp fixing means 14 has an integral construction, and includes a fitting portion 15 into which the lamp box is releasably inserted to be fixed thereto, two positioning shafts 16, a first open portion 14a, and a second open portion 14b. A lamp socket 17 is mounted on the lamp fixing means 14. When inserting the lamp, the lamp socket 17 is connected to the socket 13, and at this time the positioning shafts 16 fit respectively into the fitting holes 3g and 3h, and therefore guide the insertion of the lamp box. A cooling fan 18 is fixedly connected to the first open portion 14a. The cooling fan 18 may be fixedly connected to the second open portion 14b. When the lamp is thus in the inserted condition, an air passage, extending from the first open portion 14a to the second open portion 14b via the through holes 5a, the first notch 2a in the concave mirror 2, the light-emitting tube 1, the second notch 2b in the concave mirror 2, the notch hole 3d and the notch holes 3e, is formed. This air flow is indicated by arrows in FIGS. 5 and 6. A lamp lighting block 19 (which is a lighting stabilizer, and is commonly referred to as "ballast") is fixedly mounted on a mounting base 20, and the mounting base 20 has an opening 20a, and is disposed at the intake side of the cooling fan 18. The air passage 3f in the base portion 3b has narrow portions and wide portions arranged alternately, and hence has a muffler-like configuration to provide a large surface area, thereby achieving a good cooling efficiency.

With the above construction, the air passage, extending from the first open portion 14a to the second open portion 14b, is formed, and the efficient cooling can be effected by rotating the cooling fan 18. Tests of this embodiment were conducted, and the cooling performance, obtained when the lamp device was cooled in a set (actual device), was generally the same as the cooling performance obtained when the lamp was in a unit condition (in which only the concave mirror and the light-emitting tube were used). And besides, when the light-emitting tube was forcibly burst in the lamp, no sound except a sound from the long passage up to the second open portion 14b as well as a sound produced from the metal portion by an air blast leaks to the exterior, and it has been confirmed from tests that the burst sound is lower about 10 dB than that of the conventional lamp unit.

As described above, in the liquid-crystal projection apparatus of the present invention, the air passage, extending from the first open portion (the inlet side) of the lamp fixing means to the second open portion (the outlet side) of the lamp fixing means, is formed, and the lamp device is closed except for this air passage. Therefore, the air, introduced into the lamp, is efficiently discharged therefrom as hot air. Even if the light-emitting portion should burst to produce a large sound, the sound hardly leaks to the exterior because of the double-box construction (constituted by the lamp fixing means and the outer casing). Where the sound insulating material is provided, a metal sound due to an air blast is alleviated. Even if glass pieces and so on are scattered upon bursting of the light-emitting tube, these will not enter the set from the lamp box since the lamp device is closed except for the air passage, and it is only necessary to exchange the lamp box, and it is not necessary to clean the inside of the set. Heat, generated by the lighting stabilizer, can also be caused to efficiently escape to the exterior from the intake side of the cooling fan through the interior of the lamp box. The cooling fan may be provided near to the second open portion, in which case the cooling air is first fed to the lamp so that the heat of the light-emitting portion can escape to the outside of the concave mirror. When the lamp device is inserted and removed in a direction perpendicular to the optical axis extending from the lamp through the liquid-crystal panels and the projection lens, the lamp device is fitted while being guided by the guide means, and therefore when the lamp is inserted and removed in a direction perpendicular to the reflection axis of the concave mirror, the light-emitting portion and the concave mirror can be precisely positioned in the direction of the optical axis.

What is claimed is:

1. A liquid-crystal projection apparatus comprising a lamp having a light source portion; a group of liquid crystals for controlling the transmission of light from said light source portion; a group of mirrors for effecting color separation and color composition of the light from said light source portion; a lighting stabilizer containing a circuit for lighting said lamp; lamp fixing means; a cooling fan for feeding the air so as to cool said lamp; and a projection lens for enlarging and reducing a transmitting-light image formed by said group of liquid crystals;

wherein said lamp comprises a concave mirror for reflecting the light from said light source portion to said group of mirrors in such a manner that said reflected light is formed into generally parallel rays of light, said concave mirror having a pair of first and second notches formed respectively at its upper and lower portions; a support member supporting said concave mirror; an outer casing which encloses said concave mirror and said light source portion, and is fixedly mounted on said support member, said outer casing having through holes formed through one side wall thereof; a flat glass panel fixedly mounted on said support member for transmitting said generally parallel rays of light therethrough; and an air passage formed within said outer casing.

2. Apparatus according to claim 1, in which said support member includes a mounting portion supporting said concave mirror, and a base portion mounted substantially perpendicularly on said mounting portion, and said base portion has two notch holes communicating with said second notch, and an air passage, extending between said two notch holes, is formed in said base portion.

3. Apparatus according to claim 1, in which said lamp fixing means is releasably fitted relative to said lamp, and has a first open portion to which said cooling fan is directly connected, and a second open portion, and an air passage, extending from said cooling fan to said second open portion sequentially via the outside of said concave mirror, said first notch in said concave mirror, said second notch in said concave mirror and said two notch holes, is formed, and one of said two notch holes overlaps said second open portion.

4. Apparatus according to claim 1, in which said lighting stabilizer has an opening, and an intake side of said cooling fan is connected directly to said opening, and a discharge side of said cooling fan is connected directly to said first open portion of said lamp fixing means.

5. Apparatus according to claim 1, in which an intake side of said cooling fan is connected directly to a second open portion of said lamp fixing means, and an air passage, extending sequentially via said two notch holes, said second notch in said concave mirror, said first notch in said concave mirror and the outside of said concave mirror, is formed.

6. Apparatus according to claim 1, in which said flat glass panel is sandwiched between two elastic members, and is fixedly mounted on said support member.

7. Apparatus according to claim 1, in which a sound insulating material for absorbing a sound is mounted on an inner surface of said outer casing.

8. Apparatus according to claim 2, in which said support member has two fitting holes in a plan generally parallel to said base portion, and said lamp fixing means includes two positioning shafts, and said two positioning shafts are fitted respectively into said fitting holes so as to guide the attachment and detachment of said lamp.

9. Apparatus according to claim 2, in which said air passage, formed in said base portion, has narrow portions and wide portions arranged alternately.

* * * * *